June 4, 1935.  W. G. KING ET AL  2,003,510
FILM REEL
Filed April 8, 1932  2 Sheets-Sheet 1
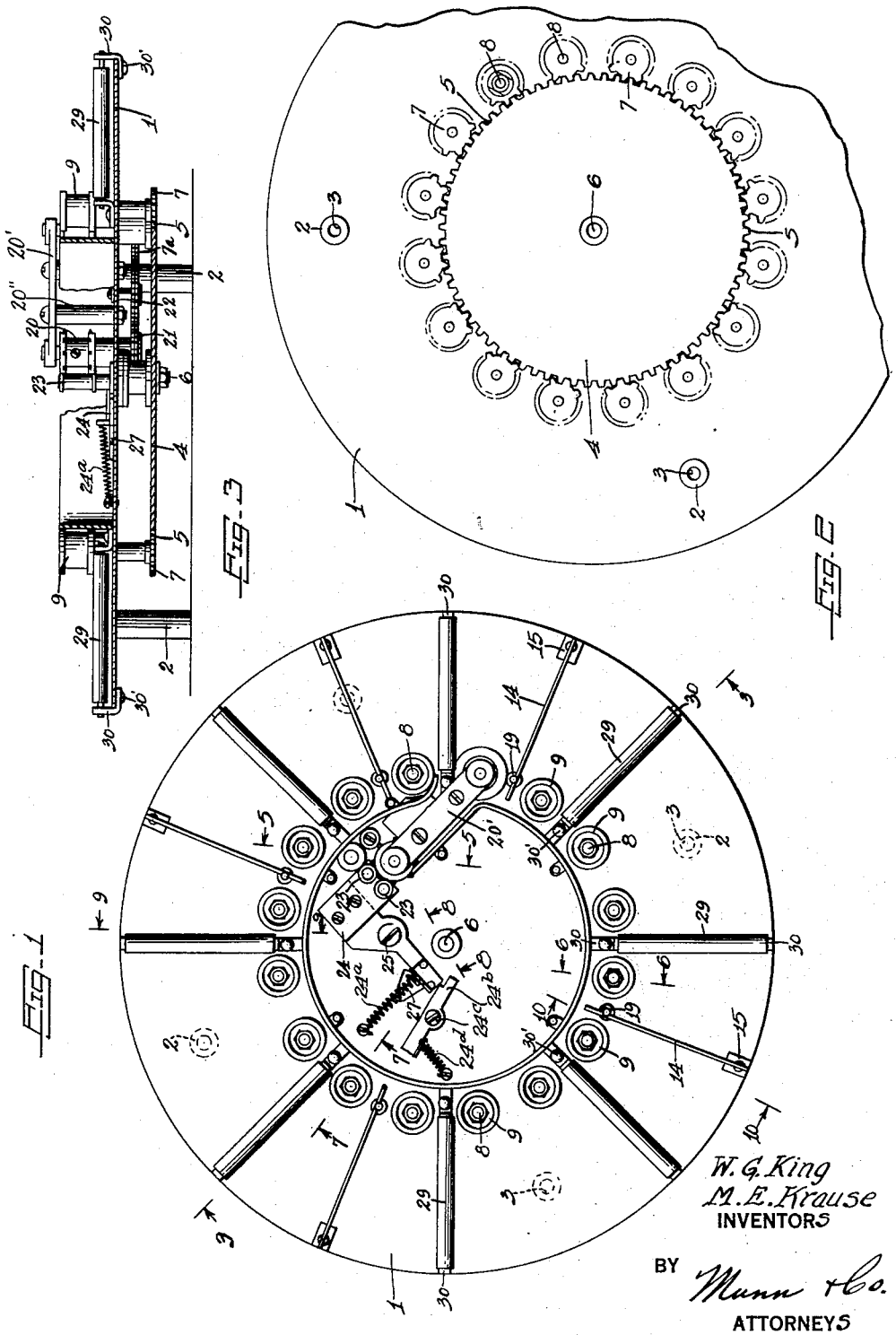
W. G. King
M. E. Krause
INVENTORS
BY Munn & Co.
ATTORNEYS

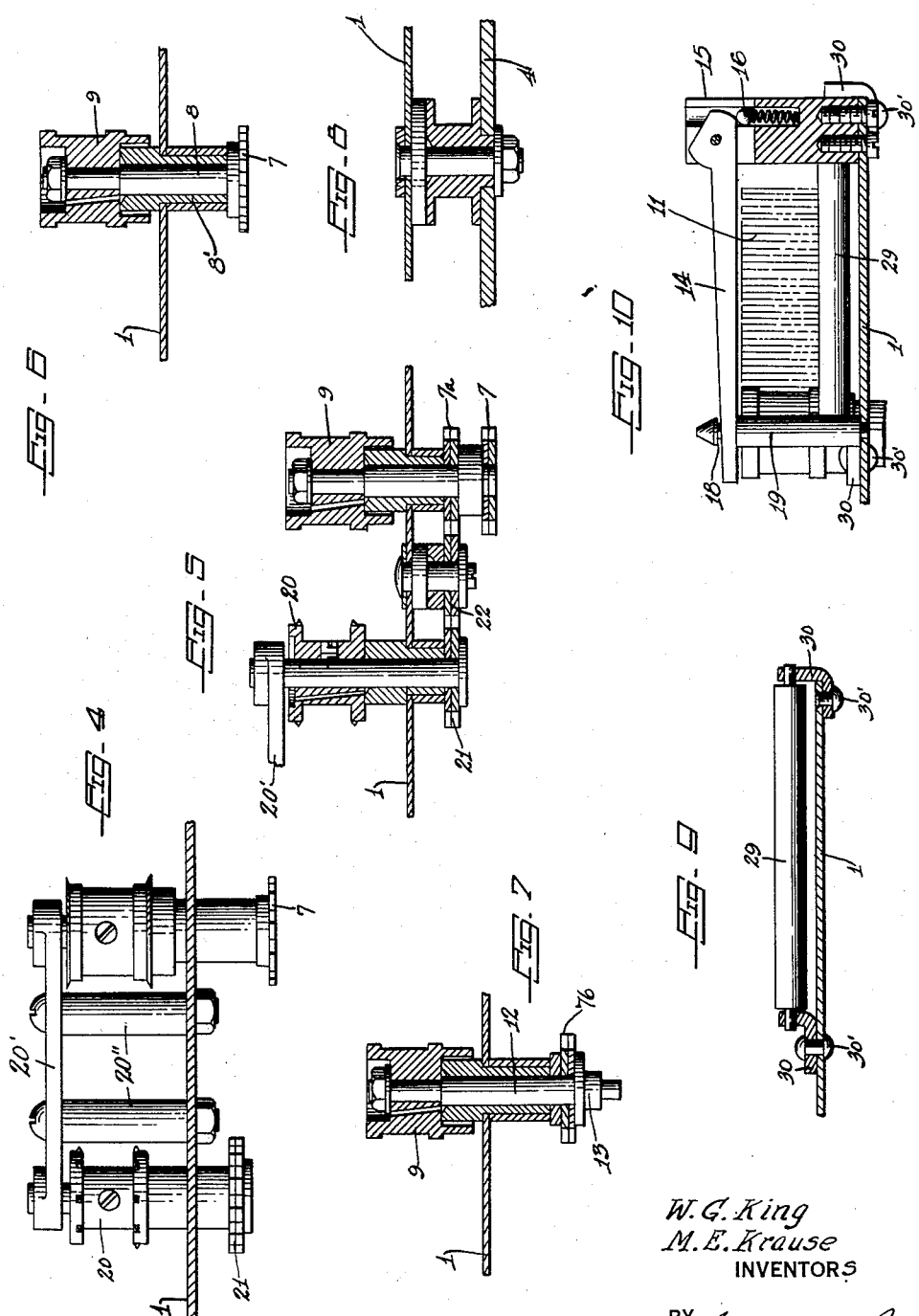

Patented June 4, 1935

2,003,510

UNITED STATES PATENT OFFICE 2,003,510

FILM REEL

Walter G. King and Max E. Krause, Chicago, Ill.

Application April 8, 1932, Serial No. 604,090

3 Claims. (Cl. 88—18.7)

Our invention relates to improvements in film reels, and it consists in the combinations, constructions, and arrangements herein described and claimed.

An object of our invention is to provide a film reel which has novel means for driving the circularly-grouped rollers contacting with the flat surface of the film at the inner convolution of a roll of film and for regulating the movement of the film under varying operating conditions. With this construction the friction between the film and the means for supporting and retaining the film in an operative position is reduced to a minimum, thus obviating the possibilities for film breakage and adding to the effective life of the film.

A further object of our invention is to provide a device of the type described with a means for safely and operatively holding the film in position with relation to the circularly-grouped spools within the convolution of film and the film-supporting means.

A further object of our invention is to provide a device of the type described by means of which an endless film may move continuously or intermittently in a continuous path from the inner convolution of a roll of film revolving about the circularly-grouped spools onward through the mechanism of a projector and past the lens and back on to the outer convolution of a roll of film without undue strain or intricate twists or loops in the film.

A further object of our invention is to provide a device of the type described by means of which the film reel may be disposed in a horizontal, vertical or inclined position, in any of which positions the film and the device will work equally efficiently.

A further object of our invention is to provide an improvement upon the film reels disclosed in our United States Patent No. 1,829,095 granted the 27th day of October 1931. The device of the present application is characterized by the omission of the supporting plate and the provision of improved driving means and film-supporting rollers, whereby the reels are rendered more dependable in operation.

A further object of our invention is to provide a device of the type described wherein a film may be readily inserted and readily taken off, without requiring great mechanical skill or aptitude in these operations.

A further object of our invention is to provide a device of the type described wherein all parts of similar nature or construction are standardized and readily interchangeable.

A further object of our invention is to provide a device of the type described by means of which the film and the film reel may readily be detached, as a unit, from a projector and be attached to any other projector of similar make.

A further object of our invention is to provide a device of the type described wherein the movement of all film-contacting parts of the device and the film-contacting parts of the projector wherein the device is used are synchronized thus eliminating possibilities of film breakage in the process of moving the film from the device, through and past the projector, and back to and on the film reel.

A further object of our invention is to provide a device of the type described which will readily and efficiently drive, support and handle other strips or sections of materials of a nature or usage similar to projection film.

A further object of our invention is to provide a device of the type described which will drive and operatively retain strips or sections of matter or materials whereby characters, codes, sound-tracks, images or letters perforated in, printed, photographed or embossed on such strips or sections or matter or materials may be projected, shown, displayed or otherwise utilized, repeatedly, as in a continuous picture projecting machine or other device for projecting, showing, displaying or using such characters, images, or letters.

A further object is to provide a device of the type described which will propel the film and will deliver it from the inner convolution of the film roll to the feed or take off sprocket without subjecting the film to any pull whatever or any undue stress or strain.

A further object is to provide a device of the character described which handles the film from the time the film first enters the outer convolution of its roll until after it passes a feed or take off sprocket without at any time subjecting the film to any undue stress or strain.

A further object is to provide a device of the character described which has definite means for feeding and regulating a roll of film or other matter without pulling any portion of the film or matter at any time while the film is on the reel.

Other objects and advantages will appear in the following specification, and the novel features of the invention will be particularly pointed out in the appended claims.

Our invention is illustrated in the accompanying drawings, forming part of this application, in which:

Figure 1 is a top plan view of an improved reel embodying our invention,

Figure 2 is a bottom plan view of the same reel,

Figure 3 is a section along the line 3—3 of Figure 1,

Figure 4 is an elevational view showing the feed-regulating sprocket 20,

Figure 5 is a section along the line 5—5 of Figure 1,

Figure 6 is a section along the line 6—6 of Figure 1,

Figure 7 is a section along the line 7—7 of Figure 1,

Figure 8 is a section taken along the line 8—8 of Figure 1,

Figure 9 is a section taken along the line 9—9 of Figure 1, and

Figure 10 is a section taken along the line 10—10 of Figure 1 showing the film coil in position.

In carrying out our invention we provide a base plate 1 which is provided with supports 2 which are provided with internally recessed portions 3, whereby the magazine may be operatively positioned. A gear plate or gear wheel 4 having gear teeth 5 is rotatably secured to a shaft 6 which is rigidly and centrally mounted on the base plate 1. The teeth 5 of the plate gear 4 are in mesh with a plurality of spaced apart pinions 7 which are rigidly attached to shafts 8. These shafts are in turn rigidly secured to film spools 9. The film spools 9 are rigidly mounted upon the shafts 8 which revolve in bearings 8' which in turn are rigidly secured to the base plate 1.

The spools 9, as clearly shown in Figs. 5, 6 and 7, are recessed to fit over the ends of the bearings 8' so as to prevent any possibility of the moving film coming in contact with the stationary bearing.

One of the spools 9, see Figure 7, is mounted upon a clutch shaft 12 which has a separable power transmission unit 13 carried thereby and disposed upon the opposite side of the base plate 1 from that of the spool 9. A plurality of film guard arms 14 are pivotally mounted upon the film guard posts 15 which are rigidly mounted upon the base 1. The arms 14 have their outer ends normally held in a position parallel with the base plate 1 by means of spring-pressed balls 16. The inner ends of the arms 14 are held beneath the edges 18 of conical-shaped retaining members 19 which are mounted upon the base 1.

A regulating feed sprocket 20 is rotatably mounted upon the base plate 1 and has a gear 21 attached thereto, which is in mesh with an idler gear 22, the idler gear in turn being in mesh with the adjacent pinion 7a. A detailed view of the feed-regulating sprocket and the adjacent mechanism is shown in Figures 4 and 5. The feed sprocket 20 and an adjacent spool 9 are held in proper alignment by a bridge member 20' which is rigidly supported over the plate by sleeve and bolt means 20'' in a manner which may be best understood by referring to Figure 4. This bridge 20' insures the smoothness of operation of the feed sprocket 20 and its adjacent bridge-connected spool 9 by maintaining the feed sprocket 20 and the bridge-connected spool 9 in constant parallel alignment with each other.

Guard rollers 23 are rotatably mounted upon a guard arm 24 which is pivotally secured to the base 1 as at 25. The guard arm 24 has on the opposite side of the pivot from the rollers, a spring 24a which tends to keep the rollers pressed toward the feed sprocket. An adjustable eccentric stop member 27 is pivotally secured to the base 1 by means of a screw. This stop member, as will be seen from the drawings, bears on the end of the arm 24 and by moving the stop member on its pivot the end of the arm bearing the rollers may be moved so as to adjust the distance between the guide rollers 23 and the feed roller 20. A spring pressed detent 24b is pivotally mounted at 24c and is held in contact with the end of the arm 24 by means of a spring 24d. When it is desired to remove or replace the film from the sprocket the arm 24 may be swung on its pivot until the end of the detent 24b engages the arm when the latter is held with its rollers free from the film and the film may be easily removed or replaced. A plurality of spaced, elongated, radially disposed rollers 29 are rotatably mounted on supports 30 which are in turn rigidly secured to the base plate 1 by any suitable means such as, for instance, rivets 30'. These rollers support the film 11 in a manner facilitating the film creepage incidental to the operation of this type of film reel.

From the foregoing description of the various parts of the device, the operation thereof may be readily understood. During the operation of the device power is transmitted to the shaft 12 through the power transmission unit 13, thus rotating a pinion 76 which is rigidly carried by the shaft 12, thus imparting a rotating movement to the gear plate 4 through its teeth 5. In this manner the spools 9, due to their operative connection with the pinions 7 are rotated in unison by reason of the pinions being in mesh with the gear plate 4. The film coil 11 is mounted outside the spools 9 and may be supported upon the rollers 29, see Figure 10. In operation these rollers may be rotated by the movement of the film coil.

The film from the inner convolution, after contacting the spools 9, passes between the feed-regulating sprocket 20 and the guard roller 23 where it is operatively guided and loosely meshed with the teeth upon the feed-regulating sprocket 20. During the movement of the film, the film is constantly and solely driven by reason of its contact with the spools 9, which are synchronized with the feed-regulating sprocket 20. Due to this driving arrangement and synchronization, there is no undue strain or pull upon any portion of the film.

The great advantage of the before disclosed construction is that the film may be moved in a continuous path without twisting, pulling, or otherwise straining the film so as to cause breaking or damaging of the film. The radially disposed rollers 29 provide a rolling base or abutting means which permit the film to be moved with little resistance and at the same time enables the film to creep inwardly in a free and easy manner.

By adjusting the eccentric stop member 27, the position of the guard roller 23 against the film, for guiding and meshing the film in engagement with the feed regulating sprocket 20, may be varied, as may be found expedient.

If desired, the guard arm 14 may be provided with any suitable rollers, not shown, which are adapted to coact with the radially disposed roller 29.

The base plate 1 may be provided with cut-out portions for the purpose of reducing the weight of the base plate.

We claim:

1. A film reel comprising a circular stationary plate, a shaft fixedly secured to and extending beneath said plate, a gear wheel rotatably mounted on said shaft, a plurality of pinion means disposed around and geared with said gear wheel, a plurality of spool means positioned above said plate and being fixedly connected to said pinions, a plurality of radially extending rollers for carrying a film reel on the outside of said plurality of spool means, one of said pinions being provided with a transmission unit whereby said gear wheel and said plurality of pinions may be moved, a second pinion fixedly secured to one of said pinions, an idler pinion operatively connected to said second pinion, a geared feed sprocket means extending through said plate and in meshed relation with said idler, and a plurality of rotatably mounted guard means for guarding the film in operative proximity to said feed sprocket means.

2. A device of the type described comprising a stationary circular plate, a shaft secured to the center of the plate on one side thereof, a gear plate rotatably mounted on said shaft, a plurality of shafts arranged concentrically about said first named shaft and extending through the circular plate, a gear carried by each of said concentrically arranged shafts and adapted to mesh with the gear plate, a film spool rigidly mounted on each of said concentric shafts on the opposite side of said circular plate, and a bearing sleeve for each of said concentrically arranged shafts rigidly secured to said circular plate, each of said spools having a recessed portion to receive one end of its respective bearing sleeve.

3. A device of the type described comprising a circular base plate, a concentric row of film spools mounted on said base plate, means for rotating the spools simultaneously and at the same speed, a series of radially disposed film engaging rollers mounted for revolution about their longitudinal axes on said plate and being disposed exteriorly of the circular row of spools, a guard plate pivotally mounted on said base, a pair of guard rollers rotatably mounted on said guard plate and arranged to engage the film, a feed sprocket disposed on the opposite side of the film from the guard rollers, a spring for normally holding the rollers against the film, a pivoted eccentric arranged to engage the guard plate for varying the distance of the guard rollers from the feed sprocket, and a spring-pressed detent arranged to engage the end of the guard plate for holding the guard rollers free from the film at will.

WALTER G. KING.
MAX E. KRAUSE.